(12) United States Patent
Oechslen et al.

(10) Patent No.: US 12,627,201 B2
(45) Date of Patent: May 12, 2026

(54) COOLING SYSTEM FOR AN ELECTRIC TRACTION MACHINE FOR A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Untergruppenbach Unterheinriet (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 258 days.

(21) Appl. No.: 18/472,247

(22) Filed: Sep. 22, 2023

(65) Prior Publication Data

US 2024/0120807 A1 Apr. 11, 2024

(30) Foreign Application Priority Data

Oct. 5, 2022 (DE) ..................... 10 2022 125 587.5

(51) Int. Cl.
*H02K 9/193* (2006.01)
*H02K 7/00* (2006.01)
*H02K 11/00* (2016.01)
(52) U.S. Cl.
CPC ............. *H02K 9/193* (2013.01); *H02K 7/006* (2013.01); *H02K 11/0094* (2013.01)
(58) Field of Classification Search
CPC .......... H02K 9/19; H02K 9/193; H02K 9/197; H02K 7/006; H02K 11/0094; H02K 3/24
(Continued)

(56) References Cited

U.S. PATENT DOCUMENTS

| | | | |
|---|---|---|---|
| 2020/0412193 A1 | 12/2020 | Eilenberger | |
| 2021/0057964 A1* | 2/2021 | Kiyomihara | H02K 11/05 |
| 2022/0329117 A1 | 10/2022 | Yu et al. | |

FOREIGN PATENT DOCUMENTS

| | | |
|---|---|---|
| CN | 111509876 A | 8/2020 |
| CN | 113364166 A | 9/2021 |

(Continued)

OTHER PUBLICATIONS

Lange (DE 102021110135 B3) English Translation (Year: 2022).*

*Primary Examiner* — Tulsidas C Patel
*Assistant Examiner* — Robert E Mates
(74) *Attorney, Agent, or Firm* — LEYDIG, VOIT & MAYER, LTD.

(57) ABSTRACT

A cooling system for an electric traction machine, including a circulation system for guiding a first cooling liquid, a first circulation pump for conveying the first cooling liquid in the circulation system, and a motor inlet connection for fluidically connecting the circulation system on an inlet side to a first winding head region of an electric traction machine intended to be temperature-controlled. The cooling system includes a motor outlet connection for fluidically connecting the circulation system on an outlet side to a second winding head region of an electric traction machine intended to be temperature-controlled, and a first heat exchanger for dissipating heat from and/or supplying heat to the first cooling liquid. A plurality of cooling grooves are arranged between the winding head regions to guide the first cooling liquid. Respective highest locations on the winding head regions are fluidically connected to each other by a second deaeration line.

18 Claims, 2 Drawing Sheets

(58) Field of Classification Search

USPC ........................................................ 310/54

See application file for complete search history.

(56) References Cited

FOREIGN PATENT DOCUMENTS

| | | | | |
|---|---|---|---|---|
| DE | 102021110135 | B3 * | 8/2022 | .............. H02K 9/19 |
| EP | 3785965 | A1 | 3/2021 | |
| JP | 2007020337 | A | 1/2007 | |
| WO | WO 2019091351 | A1 | 5/2019 | |

* cited by examiner

COOLING SYSTEM FOR AN ELECTRIC TRACTION MACHINE FOR A MOTOR VEHICLE

CROSS REFERENCE TO RELATED APPLICATIONS

This application claims benefit to German Patent Application No. DE 10 2022 125 587.5, filed on Oct. 5, 2022, which is hereby incorporated by reference herein.

FIELD

The invention relates to a cooling system for an electric traction machine for a motor vehicle. The invention further relates to a thermal management module for a powertrain of a motor vehicle, a powertrain with such a thermal management module for a motor vehicle, and a motor vehicle with such a powertrain.

BACKGROUND

Cooling systems for electric traction machines used in order to dissipate the resulting waste heat in case of a power demand are known from the prior art. In regard to increased cooling performance, the idea is to use a coolant directly flowing through at least the stator of an electric traction machine, wherein the coolant should be designed as a dielectric cooling liquid. It is advantageous to cool as few components as possible in this dielectric cooling system. Other components of a powertrain in which such an electric traction machine is integrated, e.g., a transmission and a pulse inverter, are preferably cooled in at least one separate cooling circuit. A transmission is, e.g., cooled using an oil circuit such that the coolant (transmission oil) is simultaneously configured to lubricate the transmission components. A pulse inverter is, e.g., arranged in a water circuit, using which even further vehicle components are preferably coolable.

If a traction machine is directly cooled, then (as mentioned) it is necessary that the cooling liquid (a dielectric material) be the most effective electric insulator possible. When air entrainments are present, both this electrically insulating property and the heat capacity will decrease. Therefore, the goal is to minimize the air in the line system and, above all, for it not to remain there.

SUMMARY

In an embodiment, the present disclosure provides a cooling system for an electric traction machine for a motor vehicle, the cooling system comprising a circulation system for guiding a first cooling liquid that is circulating, a first circulation pump for conveying the first cooling liquid in the circulation system, and a motor inlet connection for fluidically connecting the circulation system on an inlet side to a first winding head region of an electric traction machine intended to be temperature-controlled. The cooling system further comprises a motor outlet connection for fluidically connecting the circulation system on an outlet side to a second winding head region of an electric traction machine intended to be temperature-controlled, and a first heat exchanger for dissipating heat from and/or supplying heat to the first cooling liquid circulating in the circulation system. The electrical traction machine comprises a plurality of cooling grooves, which are arranged between the winding head regions and used to guide the first cooling liquid. A second deaeration line is provided, by which, given a normal orientation of the electrical traction machine in the Earth's gravitational field, respective highest locations on the winding head regions are fluidically connected to each other.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
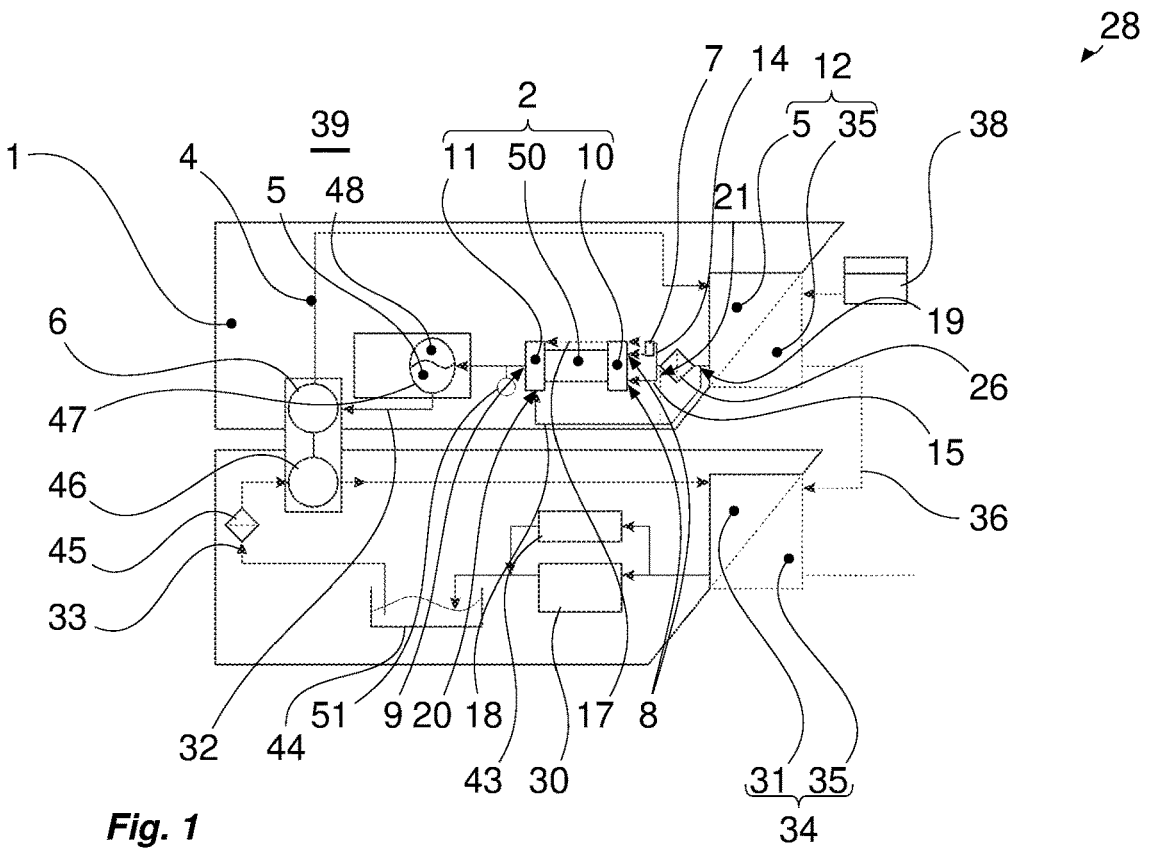
FIG. 1 illustrates a schematic diagram of a thermal management module.

In an embodiment, the present invention overcomes the disadvantages known from the prior art. The features of the disclosure can be combined in any technically advantageous manner, wherein the explanations in the following description as well as features in the drawings, which include explanatory configurations of embodiments of the invention, can also be used for this purpose.

In an embodiment, the invention relates to a cooling system for an electric traction machine for a motor vehicle, said cooling system comprising at least the following components:

a circulation system for guiding a first cooling liquid that is circulating;

a first circulation pump for conveying the first cooling liquid in the circulation system;

a motor inlet connection for fluidically connecting the circulation system on the inlet side to a first winding head region of an electric traction machine intended to be temperature-controlled;

a motor outlet connection for fluidically connecting the circulation system on the outlet side to a second winding head region of an electric traction machine to be temperature-controlled; and a first heat exchanger for dissipating heat from and/or supplying heat to the first cooling liquid circulating in the circulation system, wherein the electrical traction machine comprises a plurality of cooling grooves arranged between the winding head regions for directing the first cooling liquid.

The cooling system is characterized in particular in that a second deaeration line is provided, by means of which, given a normal orientation of the electrical traction machine, the respective highest locations on the winding head regions in the Earth's gravitational field are fluidically connected to one another.

Unless explicitly indicated otherwise, reference will be made below to the specified respective direction of circulation or direction of conveyance: before, after, and corresponding terms. Unless explicitly indicated otherwise, ordinal numbers used in the preceding and following description are used only for the sake of clear differentiation and do not reflect any order or ranking of the designated components.

An ordinal number greater than one does not necessarily mean that a further such component need be present.

To begin with, it is to be noted that, with the cooling system disclosed, waste heat is primarily intended to be dissipated, but an increase in the temperature of components being temperature-controlled by the cooling system is also a possible operating condition, e.g. in winter temperatures, so that the components are brought quickly to operating temperature. In most applications, however, waste heat is also intended to be dissipated in winter temperatures during operation of an electric traction machine of a motor vehicle, i.e., cooling is the goal. It should also be noted that the cooling system disclosed is not limited to the use of a dielectric cooling liquid, and it is also operable for, e.g., temperature control using water and/or oil as the cooling liquid. An insulator, e.g. a casing, is then preferably provided between the current-conducting components of the traction machine being temperature-controlled and the (electrically conductive or not sufficiently electrically insulating) cooling liquid.

It should further be noted that, for the sake of clarity regarding components and properties described below, components or properties of the cooling system having the same name are respectively designated as first components or properties, wherein this will not always take place in a clear context.

The cooling system comprises a circulation system, which comprises a plurality of pipes and/or pipe sections between or in those components able to be temperature controlled by means of the cooling system. Within the circulation system, the first cooling liquid is almost completely or partially encapsulated from the environment, so a loss of gaseous components occurs in that location at most in negligible amounts (e.g., as a result of leaks). Nevertheless, gas (primarily air from the environment) enters through leaks, or gas pockets are present in the circulation system as a result of assembly or maintenance work.

A (first) circulation pump is provided for circulating the first cooling liquid. A pressure gradient is generated by the circulation pump, resulting in a (first) circulation direction in the circulation system. In an embodiment, the circulation pump can be operated in two circulation directions, but the first circulation direction is the main direction of operation, at least when dissipating waste heat from the integrated electric traction machine. A reversal of the direction is adjustable by, e.g., reversing the direction of rotation of a pump wheel, but preferably by way of a corresponding way valve.

In an embodiment, a compensation tank is provided and configured for equalizing the pressure between the circulation system and the environment, wherein gas entrainments in the first cooling liquid can largely be separated in that location as a result of a pressure gradient (e.g., one open to the environment).

An electric traction machine is integrated into the cooling system for temperature control by being supplied with the first cooling liquid via a motor inlet connection, whereby the first cooling liquid introduced is then discharged from the electric traction machine via a motor outlet connection. The motor inlet connection is connected (preferably in the region of at least one of the two winding heads, i.e. the winding head region, e.g., enclosed by a housing) to the electric traction machine, and the motor outlet connection is connected at the end axially opposite to the motor (with respect to the axis of rotation of the rotor shaft of the electric traction machine and in the region of one, preferably more than one, of the two winding heads). It should be noted that when the (first) circulation direction is reversed, an outlet is formed from the motor inlet connection, and an inlet is formed from the motor outlet connection. Preferably, however, the direction of flow via the electric traction machine remains the same, i.e., the motor inlet connection is an inlet and the motor outlet connection is an outlet for the first cooling liquid, wherein this is achieved by, e.g., using appropriate line routing and/or at least one switchable directional control valve.

The (first) heat exchanger is configured to transfer heat between two fluids, i.e., the first cooling liquid and a further fluid (e.g., water or ambient air). An embodiment for air cooling comprises, e.g., a fan.

A fixed orientation to the Earth's gravitational field exists given application of the cooling system in a thermal management module. In a dynamic application, e.g. in a motor vehicle, deviations from this fixed orientation are possible during operation, or there is a regular angular range within which one location forms the highest point, but also a different angular range (e.g., during acceleration or deceleration), in which other locations form the highest point in the Earth's gravitational field. The deviating angular range is preferably sufficiently rare and/or sufficiently short. When the term "highest location" is referred to below, this means such a location, which during application is at least level and preferably also within a regular angular range, represents the highest point on the respective component. It should also be noted that the respective highest location during application is sometimes not be the absolute highest location on a component, but rather the locally highest location (therefore a local and not global maximum of the height) and/or that technical deviation is also permitted regarding a highest location, for example with an actual highest location due to a manufacturing tolerance and/or due to limited feasibility, wherein the remaining volume (tolerance-related or manufacturing-related) is preferably negligible with respect to technical application.

For example, two highest locations are the same height or (preferably only slightly, e.g., less than 1 cm [one centimeter], preferably not more than 2 mm [two millimeters]) different in height. Any air entrainment in the cooling liquid can be removed when recirculating in (at least the first) circulation direction and thus easily discharged from the respective component, i.e., during normal operation (preferably at a low or average operating pressure gradient).

In a embodiment, a second deaeration line is provided. It should be noted that the designation as a second deaeration line does not necessarily mean that a first deaeration line is provided.

The second deaeration line is arranged such that the winding head regions are fluidically connected to each other at their respective highest locations, i.e., a gas or a gas bubble is carried from one of the winding head regions to the respective other winding head regions along with the cooling liquid in the (respectively enclosed) circulation direction, and is preferably conveyed to a compensation tank and deposited therein. Preferably, this second deaeration line is provided separately from passages for controlling the temperature of the electrical traction machine, so that maximum temperature control performance, low backpressure, and effective electrical insulation are ensured in that location, because gas entrainments will most probably be guided exclusively via the second deaeration line.

In an advantageous embodiment, the first cooling liquid is a dielectric cooling liquid for direct contact with the electrically conductive and peripheral components (e.g., AC power buses) of the traction machine being temperature-controlled. "Direct cooling" is therefore a flow that directly contacts components of a unit being temperature-controlled, e.g., as a substitute for a lubricant or, as in a traction machine, preferably (among other things) as a substitute for the insulation material between the stator winding and the stator lamination package.

In an advantageous embodiment of the cooling system, an AC housing for an AC connection for an electric traction machine is provided, wherein the temperature of the AC housing and/or an AC connection in the AC housing is controllable by means of the first cooling liquid, wherein a first deaeration line is provided between the AC housing and one, preferably the first, of the winding head regions.

In this embodiment, an AC housing is furthermore provided to supply the electric traction machine, which houses an alternating current connection. By means of the AC connection, the traction machine (preferably controlled via external power electronics, e.g., comprising or formed by a pulse AC converter) is supplied with a power current or a power voltage. In this case as well, there is a narrow optimal range for an operating temperature, so it is desirable to control the temperature of the AC housing or the AC connection arranged therein. It is in this case provided to perform the temperature control using the cooling system, i.e., the first cooling liquid used to control the temperature of the traction machine. For this purpose, a first main line is provided which is fluidically connected by means of its (first) inlet (directly or indirectly) to the first heat exchanger and by means of its outlet (directly or indirectly) to the AC housing, wherein the inlet and outlet in each case are separate connection elements, or they are formed by the respective component (e.g., integrally).

By means of the (first) deaeration line, gas enclosed in the AC housing is easily conveyable by means of the (first) cooling liquid to one of the winding head regions, preferably the first winding head region for reasons of relative spatial arrangement. In this case, too, preferably the gradient or the increase (in the first recirculation direction) of the first deaeration line, i.e., between the AC housing and the respective (preferably both) winding head regions, as well as the second deaeration line is, e.g., low, as indicated above.

It is further provided in an advantageous embodiment of the cooling system, that wherein the first deaeration line is, given a normal orientation of the cooling system, indirectly or directly fluidically connected to at least one of the following highest locations in the Earth's gravitational field:

the highest location on the AC housing;
the highest location on the first winding head region; and
the highest location on the second winding head region.

It is then hereby provided that the highest location on the AC housing be the same as or (preferably little, e.g., less than 1 cm [one centimeter], preferably no more than 2 mm [two millimeters]) higher than the motor input terminal, the motor output terminal and/or another line region of the circulation system. Any air entrainment in the cooling liquid can thus be removed when recirculating in the first (first) direction of circulation and thus easily discharged from the AC housing, i.e., during normal operation (preferably at a low or average operating pressure gradient).

Preferably, given a normal orientation of the AC housing (and the entire cooling system) between the highest (first) location on the AC housing, the highest (second) location on the first winding head region and the highest (third) location on the second winding head region, there is no, a negligible, or a low (e.g., as indicated above) height difference. Any air entrainment in the cooling liquid can thereby be removed when recirculating in the (first) circulation direction and thus easily be separated from the specified components (preferably from the entire cooling system), i.e., during normal operation (preferably at a low or average operating pressure gradient) without undercuts and into a (optional) compensation tank and such a gas conveyed therefrom. Preferably, given a normal orientation, no line region of the cooling system is provided which has a higher location than the specified locations, wherein, preferably until an (optional) compensation tank is actually reached, a respective highest line region is simultaneously arranged not, negligibly little, or little lower than the specified locations.

It is further provided in an advantageous embodiment of the cooling system that the AC housing comprise at least one further connection line to the motor inlet connection and/or to the first winding head region, wherein the at least one further connection line is arranged below the first deaeration line given a normal orientation of the electrical traction machine in the Earth's gravitational field.

It is in this case provided that the first deaeration line be designed to be separate from at least one further connecting line. This first deaeration line is thus provided separately from channels for controlling the temperature of the electrical traction machine so that maximum temperature control performance, low backpressure, and effective electrical insulation are ensured in that location, because gas entrainments are likely to be guided exclusively via the first deaeration line. Any gas entrainments conveyed via the at least one connecting line can rise in the first winding head region in the Earth's gravitational field and then be discharged from the electrical traction machine via the second deaeration line. The aforementioned advantages are thus also achieved in this case in the region of the electrical traction machine.

According to a further aspect, a thermal management module for a powertrain of a motor vehicle is provided, said module comprising at least the following components:

for a transmission, an oil circuit with a second circulation direction and with a second heat exchanger;

for at least one vehicle component, a water circuit with a third circulation direction and with a third heat exchanger; and for an electric traction machine, a cooling system according to an embodiment described above, wherein a pulse inverter for the electric traction machine is preferably arranged in the water circuit.

Here the cooling system described above is integrated into a thermal management module for a powertrain of a motor vehicle, wherein this thermal management module [TMM] is generally known with respect to its functions and tasks. In addition to components of a powertrain, other vehicle components are preferably also temperature-controlled, e.g., a (preferably traction) battery.

Other components of a powertrain in which such an electric traction machine is integrated, such as a transmission and a pulse inverter, are preferably cooled in at least one cooling circuit separate from the cooling system. For example, a transmission comprising a (preferably switchable) transmission and/or a differential is cooled by means of an oil circuit using an oil, preferably directly. "Direct cooling" is a flow that directly contacts components of the transmission (e.g., gears), for example as a substitute for a lubricant. For example, the oil circuit has a conventional design. In an advantageous embodiment, a second circulation pump, which is used to generate a second circulation direction in the oil circuit, is connected to the first circulation pump, which is used to generate the first circulation direction for the first cooling liquid in the circulation system, in the form of what is referred to as a tandem pump, so that a single drive is sufficient for both circulation pumps. The waste heat is thereby released via the second heat exchanger.

Vehicle components intended to be temperature-controlled and not arranged in the oil circuit or cooling system are preferably temperature-controlled by means of a water circuit. The water is often a water-glycol mixture. The water in the water circuit is conveyed (by means of a third circulation pump) in a third circulation direction via a third heat exchanger. The third heat exchanger is in this case preferably configured for heat transfer with the environment or environmental air, wherein a fan is preferably provided for a (forced) convection on the third heat exchanger.

It should be noted that the respective components are also heatable in the oil circuit and/or the water circuit, e.g. in winter temperatures, herein, however, the main condition is in this case also the dissipation of waste heat. The respective circulation direction is also optionally reversible.

In an advantageous embodiment, a pulse inverter [PWR] for an electric traction machine intended to be temperature-controlled by the cooling system using the first cooling liquid is arranged in the water circuit for temperature control (i.e., not a component intended to be temperature-controlled in the cooling system using the first cooling liquid). It is advantageous to minimize the number of components in said cooling system for an electric traction machine. The use of a dielectric (first) cooling liquid is not necessary when using a pulse inverter. It is therefore advantageous to arrange the pulse inverter outside of said cooling system.

It is further provided in an advantageous embodiment of the thermal management module that the water circuit be connected to the first heat exchanger of the cooling system for an electric traction machine used for heat transfer, preferably as the only liquid-bound heat transfer means from the cooling system to the environment, wherein, preferably in the third circulation direction of the water circuit, a pulse inverter for an electric traction machine is arranged upstream of the first heat exchanger.

It is provided that the cooling system in this case be heat-coupled to the first cooling liquid and the water circuit, i.e., the water circuit is configured by means of the (first) heat exchanger for temperature control of the first cooling liquid. In the first heat exchanger, e.g., when cooling the electric traction machine (technically without liquid exchange), the heat is then transferred from the first cooling liquid to the water in the water circuit.

In a preferred embodiment, no further (forced) convection is provided for temperature control of the electric traction machine (and preferably also no further components in the cooling system) or for dissipating heat from the first cooling liquid. Rather, the first heat exchanger is then the only unit of the cooling system used for transferring heat, i.e., using the water circuit.

In a preferred embodiment, the pulse inverter is arranged in the (third) circulation direction of the water circuit upstream of the first heat exchanger, so that the temperature gradient via the pulse inverter is as large as possible, whereas the temperature gradient via the first heat exchanger (given the usually quite large heat output by the electric traction machine) is still sufficient.

In an advantageous embodiment, a reversing valve is provided for reversing the (first) circulation direction. In an embodiment, the first cooling liquid then passes through a separate return channel. The same line is preferably used for both directions.

Thus, in the main direction, the order of the components is (beginning with the first circulation pump):

1. the first circulation pump;
2. the first heat exchanger;
3. the electric traction machine; and
4. the compensation tank.

In this case, within the main direction, the bypass section described above is preferably arranged such that it connects a line section of the circulation system from the first circulating pump to a line section upstream of the compensation tank. And the order of the components in the secondary direction is thus:

1'. the first circulation pump;
2'. the compensation tank;
3'. the first heat exchanger; and
4'. the electric traction machine.

It should be noted that flow also passes through possible further components in the cooling system in reverse order, or it flows through only some or exclusively the three specified components in reverse order.

It is furthermore provided in an advantageous embodiment of the thermal management module that the water circuit also be connected to the second heat exchanger of the oil circuit for heat transfer, preferably as the only liquid-borne heat transfer from the cooling system to the environment, wherein, preferably in the third circulation direction of the water circuit, the first heat exchanger is arranged upstream of the second heat exchanger.

It is provided that the oil circuit and the water circuit in this case be heat-coupled to one another, i.e., the water circuit is configured by means of the (second) heat exchanger for temperature control of the oil. In the second heat exchanger, e.g., when cooling the transmission (technically without liquid exchange), the heat from the oil in the oil circuit is transferred to the water in the water circuit.

In a preferred embodiment, no further (forced) convection is provided for temperature control of the transmission (and preferably also no further components in the oil circuit) or for dissipating heat from the oil. Rather, the second heat exchanger is then the only unit in the oil circuit used for heat transfer, i.e., using the water circuit.

In a preferred embodiment, the first heat exchanger is arranged in the (third) circulation direction of the water circuit upstream of the second heat exchanger so that the temperature gradient via the first heat exchanger is as large as possible, whereas the temperature gradient via the second heat exchanger (given the usually higher permissible temperature level in a transmission in comparison to an electric traction machine) is still sufficient.

According to a further aspect is a powertrain for a motor vehicle, which powertrain comprises at least the following components:

at least one electric traction machine for providing a torque;

at least one propulsion wheel for propelling the relevant motor vehicle by means of a torque from the electric traction machine;

at least one transmission for transferring a torque between the electric traction machine and at least one of the propulsion wheels; and a cooling system according to an embodiment described above for at least one of the electric traction machines and/or a thermal management module according to an embodiment described above for at least one of the electric traction machines, at least one of the transmissions, and at least one vehicle component, as well as preferably a pulse inverter for at least one of the electric traction machines.

A powertrain is then hereby provided, which comprises at least one electric traction machine, by means of which torque is generated. The torque of the respective electric traction machine is transferable to at least one propulsion wheel via a transmission. The at least one propulsion wheel is configured to propel the motor vehicle. The temperature control of the components of the powertrain is performed by a cooling system or a thermal management module comprising a cooling system according to an embodiment described above. Environmental air is preferably used for the third heat exchanger, i.e., passively by means of the relative wind and/or actively by means of a fan.

According to a further aspect is a motor vehicle comprising a chassis with a transport compartment and a powertrain according to an embodiment described above for propelling the motor vehicle.

The motor vehicle is provided for transporting at least one passenger and/or goods and comprises a passenger compartment and/or a cargo compartment. The motor vehicle is driven via the at least one propulsion wheel by means of the torque from at least one of the electric traction machines.

Embodiments of the invention described above are explained in detail below with reference to the accompanying drawings, which illustrate preferred configurations in the context of the relevant technical background. The invention is in no way limited by the purely schematic drawings, wherein it is noted that the drawings are not drawn to scale and are not suitable for defining exact proportions.

Figure 2:
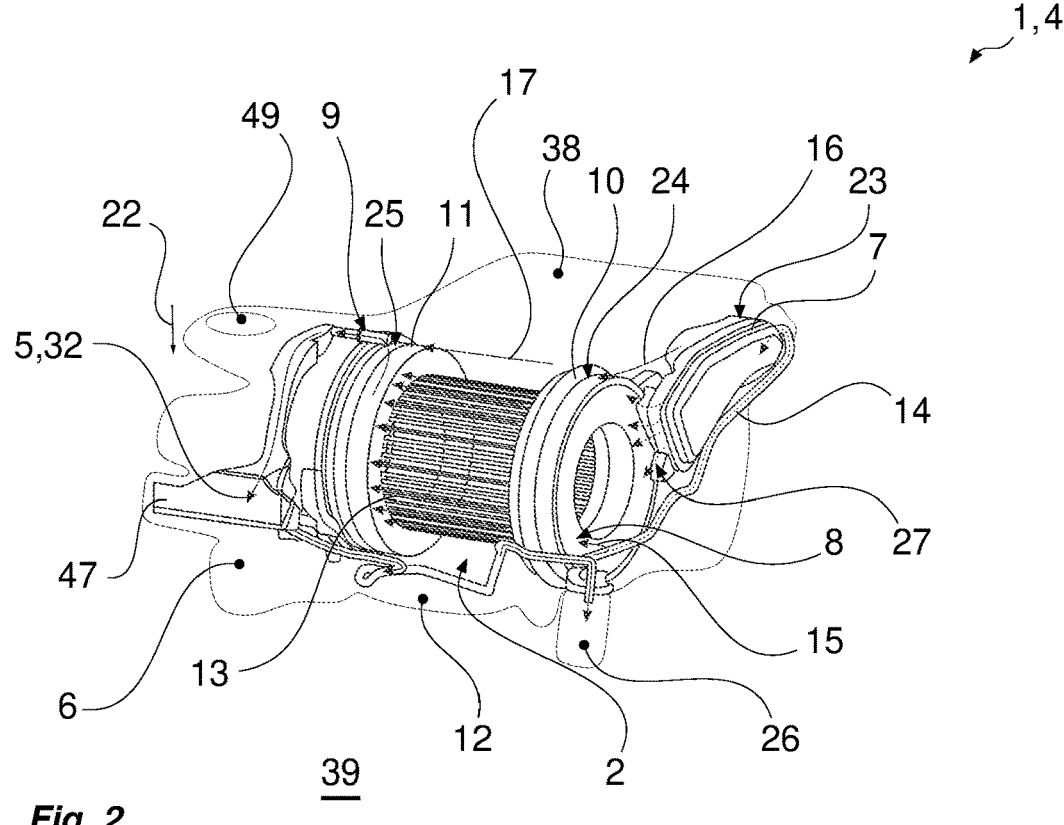
FIG. 2 illustrates a first spatial view of a cooling system.

FIG. 1 shows a schematic diagram of a thermal management module 28 comprising a cooling system 1 according to FIG. 2 for an electric traction machine 2. A first heat exchanger 12 of the cooling system 1 is in this case configured for heat transfer using a water circuit 35 (shown only partially in this case), so that the first cooling liquid 5 of the circulation system 4 of the cooling system 1 and the water (mixture) of the water circuit 35 exchange heat with each other. A second heat exchanger 34 of an oil circuit 31 for a transmission 30 is in this case likewise configured for heat transfer using the water circuit 35 (shown only partially in this case), so that the oil of the oil circuit 31 and the water (mixture) of the water circuit 35 exchange heat with each other.

Arranged in the water circuit 35 is a pulse inverter 38 for the electric traction machine 2 intended to be temperature-controlled in the cooling system 1, i.e., in the (third) circulation direction 36 of the water circuit 35 upstream of the first heat exchanger 12 of the cooling system 1 using the (first) cooling liquid 5. In addition, the second heat exchanger 34 is arranged downstream of the first heat exchanger 12 in the third circulation direction 36.

Arranged in the oil circuit 31, in the (second) circulation direction 33 is a transmission 30 and a transmission component 43 downstream of the second heat exchanger 34, which are in this case connected in parallel to one another. Arranged subsequently is an oil sump 44, then a coarse filter 45, and finally (as shown in the illustration) a second circulation pump 46 in the oil circuit 31. The second circulation pump 46 is in this case (purely optionally) designed as a tandem pump with a first circulation pump 6 of the cooling system 1 with the first cooling liquid 5.

The cooling system 1 comprises a circulation system 4, in which the following components are arranged in the (first) circulation direction 32:

1. the first circulation pump 6;
2. the first heat exchanger 12;
3. a purely optional (oil) filter 26;

4. the electric traction machine 2, through which flow takes place via a motor inlet connection 8 and a motor outlet connection 9; and
5. a compensation tank 47.

The compensation tank 47 is filled partly with the first cooling liquid 5 and partly with a gas 48, whereby a pressure increase resulting from a temperature-related volume increase can be compensated for or at least mitigated by means of the volume compensation tank 49 and the compressible gas 48 contained therein. Alternatively, the compensation tank 47 is configured to exchange air from the environment 39. Using appropriate filters, this exchanged air can be completely or partially freed of coolant components, humidity, or contamination. It should be noted that, in the illustrated embodiment of the thermal management module 28, no heat exchanger is from the cooling system 1 and the oil circuit 31 is provided for heat transfer to the environment 39. The first heat exchanger 12 and the second heat exchanger 34 are instead connected to the water circuit 35.

Figure 3:
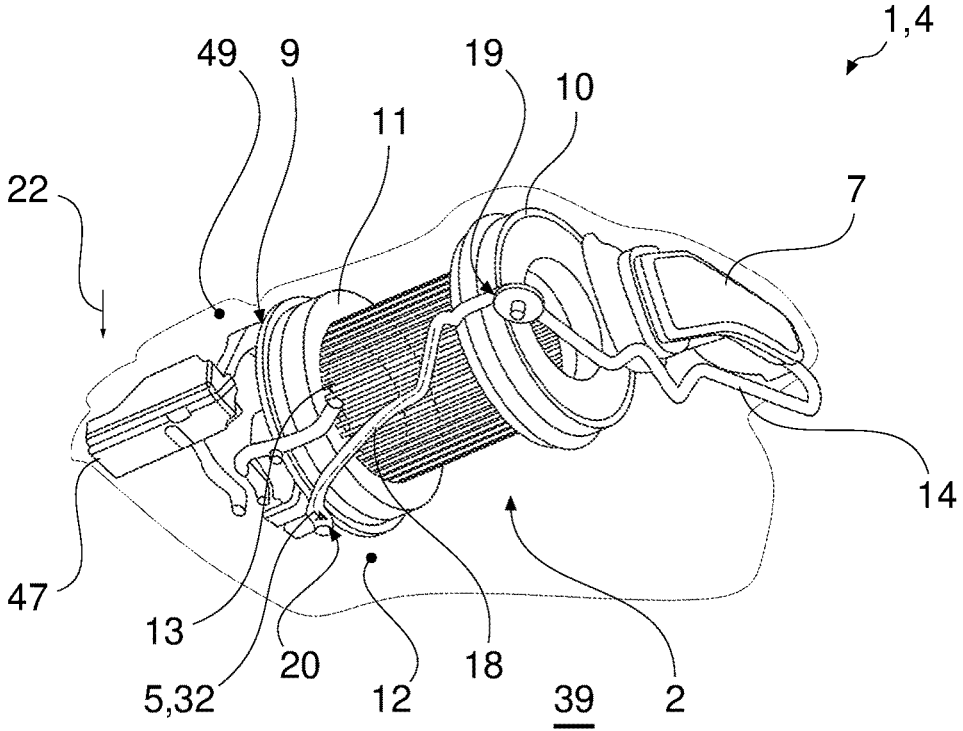
FIG. 3 illustrates a second spatial view of the cooling system according to FIG. 2.

The electric traction machine 2 is in this case provided with (purely optional) deaeration lines 16, 17, main lines 14, 15, and a bypass line 18. The electric traction machine 2 is in this case equipped with a first winding head region 10 (shown at the right end) of a stator lamination package 50 (preferably comprising cooling grooves 13 (as shown in FIG. 2 and FIG. 3) and a second winding head region 11 (shown at the left end), wherein the designations as the first winding head region 10 and second winding head region 11 are selected solely according to the flow sequence in the first circulation direction 32, without taking the bypass line 18 into consideration. Advantageous embodiments of the deaeration lines 16, 17, the main lines 14, 15, and the bypass line 18 are shown and explained in greater detail in the following FIGS. 2 and 3. Purely optionally, a temperature sensor 51 for sensing the temperature of the first cooling liquid 5 in the circulation system 4 of the cooling system 1 is provided downstream of the electric traction machine 2.

Arranged directly behind the first heat exchanger 12 is a bypass line 18, which branches off via a first connection 19 and is fluidically connected directly via the second connection 20 to the second winding head region 11 of the electric traction machine 2. A purely optional third connection 21 is in this case shown (by dashes), which connection alternatively or additionally supplies the bypass line 18.

Furthermore, a purely optional second deaeration line 17 is shown (by dashes) between the two winding head regions 10, 11, which line is designed to be separate from a flow through the stator lamination package 50. The second deaeration line 17 is preferably connected to the respective highest and, at least in the first winding head region 10, the highest (second) location 24 (see FIG. 2), wherein the second deaeration line 17 is, given a normal orientation in the Earth's gravitational field 22 during application of the thermal management module 28 without raising or lowering in a direction parallel to the Earth's gravitational field 22, i.e., with preferably no hydraulic undercuts being formed.

A branch is provided in upstream of the first winding head region 10 (and purely optionally downstream of the (oil) filter 26), wherein a second main line 15 is directly connected to the first winding head region 10, and a (purely optional) first main line 14 is routed via an AC housing 7 and only thereafter into the first winding head region 10. It should be noted that, in an embodiment, only a first main line 14, i.e. the traction machine 2, is supplied with (the first) cooling liquid 5—solely via the AC housing 7, and, in an alternative embodiment, only a second main line 15 according to this description is provided. In an embodiment with both a first main line 14 and a second main line 15, the first main line 14 is preferably feedable at a higher flow rate than the second main line 15, the (first) flow rate of the first main line 14 preferably being (about) twice as high or more than the (second) flow rate of the second main line 15. In an embodiment, a ratio between the flow rates of the main lines 14, 15 can be changed. For example, at least one of the main lines 14, 15 can be closed, and/or the associated flow rate can be controlled.

FIG. 2 shows a spatial view of a cooling system 1, wherein the components are transparent (indicated by a dotted line), and the lining of the circulation system 4 is indicated by a solid line. Purely functionally, reference is made to the cooling system 1 in the circuit diagram shown in FIG. 1, wherein only one possible embodiment of a cooling system 1 according to the circuit diagram described above is shown without excluding general cases.

Seen at center is the electric traction machine 2 or housing, which comprises a cooling means for the first winding head region 10 (shown at right) and for the second winding head region 11, as well as a plurality of cooling grooves 13.

Spatially behind the traction machine 2 are power electronics comprising at least one pulse inverter 38 and indicated at the left of the traction machine 2 is a volume compensation tank 49 (purely optional), wherein the volume compensation tank 49 (for the first cooling liquid 5 as a dead-end) is connected to the compensation tank 47. The volume compensation tank 49 is configured to compensate for volume fluctuations as a result of pressure variations and/or gas entrainments, and it is designed to be open or closed to the environment 39.

Shown at left is an advantageous embodiment of a compensation tank 47, an L-shaped structure which is directly connected to the motor outlet connection 9 in the second winding head region 11 and connected to the (first) heat exchanger 12 via a (first) circulation pump 6. The heat exchanger 12 is in turn fluidically connected to the first winding head region 10 via a (purely optional) (oil) filter 26 and a second main line 15 which is connected downstream.

Branching off from the second main line 15 (and in this case downstream of the (oil) filter 26), a first main line 14 can be seen, which is fluidically connected to the (in this case purely optionally highest) location 23 on the AC housing 7. Note that this is not intended to mean that the first main line 14 of the second main line 15 is in this case subordinate or necessarily supplied at a lower volume flow rate. The AC housing 7 is in turn fluidically connected to the first winding head region 10 via (here a plurality of) connecting lines 27. However, a separate (first) deaeration line 16 is also provided in this case, which is fluidically connected to the highest (first) location 23 on the AC housing 7 and the highest (second) location 24 on the first winding head region 10. As the term indicates, this line is configured to remove gas entrainments from the AC housing 7. The cooling liquid 5, which is guided via the connecting lines 27, is therefore most probably gas-free, or the quantity of gas conducted along with it is negligible.

A separate second deaeration line 17 is provided between the first winding head region 10 and the second winding head region 11 in parallel to the cooling grooves 13, by way of which the highest (second) location 24 of the first winding head region 10 and the highest (third) location 25 of the second winding head region 11 are fluidically connected to one another. Preferably, these highest points 23, 24, 25 are all arranged at the same level when the cooling system 1 is in a normal orientation in the Earth's gravitational field 22.

Preferably, the cooling grooves 13 are in direct contact with the stator lamination package 50 and/or the stator winding, e.g., by being provided as recesses, preferably directly in the grooves for a stator winding. In an embodiment, the cooling grooves 13 are formed in the intermediate space in the stator grooves and the winding, e.g., designed as what are referred to as hair pins (with insulation paper optionally in the stator grooves).

FIG. 3 shows a second spatial view of the cooling system 1 shown in FIG. 2, wherein a bypass line 18 (provided purely optionally) can be seen. Apart from this and without excluding general cases, reference is made to FIG. 2 purely for the sake of clarity.

Via a first connection 19, the bypass line 18 branches out (in this case exclusively) in the circulation direction 32 upstream of the (oil) filter 26 and downstream of the first heat exchanger 12. The bypass line 18 is fluidically connected to the second winding head region 11 via the second connection 20. The remaining lines (i.e., the first main line 14, the second main line 15, and the cooling grooves 13) are thus bridged, and a direct connection between the heat exchanger 12 and the second winding head region 11 is created, and the second winding head region 11 is thus supplied with the cooling liquid 5 at a lower temperature in the event of cooling than if the second winding head region 11 were exclusively downstream of the second winding head region 11 (and optionally the AC housing 7) and the stator lamination package 50 in the circulation direction 32.

Figure 4:
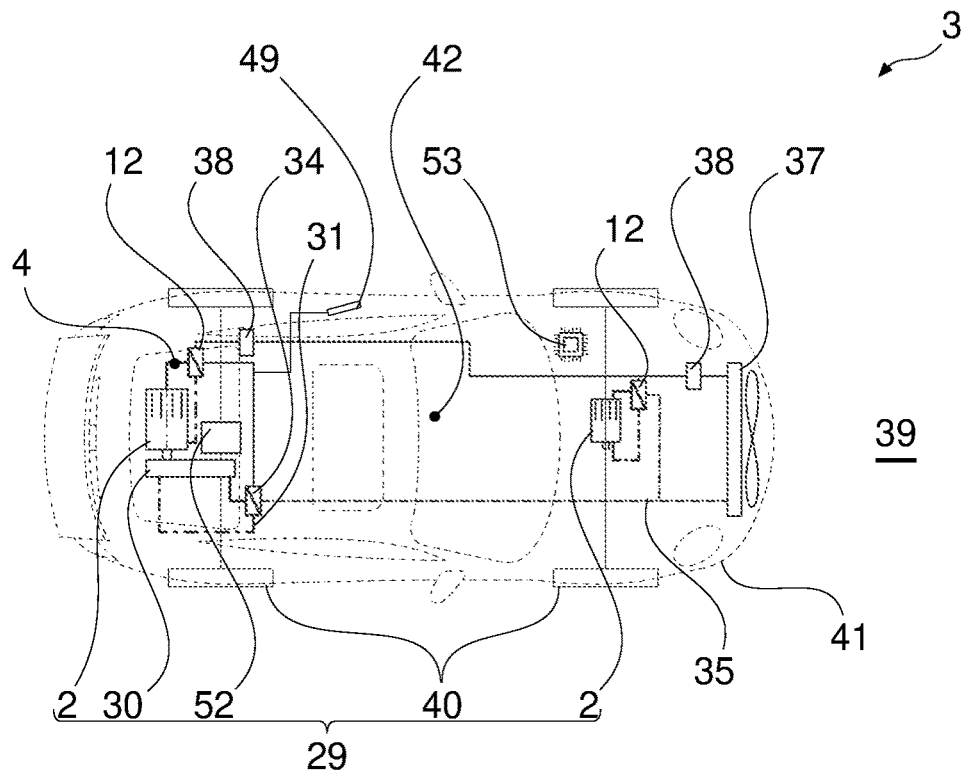
FIG. 4 illustrates a schematic top view of a motor vehicle with a thermal management module.

FIG. 4 is a schematic overhead view of a motor vehicle 3 comprising a thermal management module 28 with a powertrain 29. The motor vehicle 3 comprises approximately in the center of its chassis 41 a transport compartment 42, e.g. a passenger compartment, and on the sides of its chassis 41 four propulsion wheels 40 used to propel the motor vehicle 3. In front is an electric traction machine 2 (optionally purely coaxial in this case) and, behind, a further electric traction machine 2 (in this case optionally arranged purely parallel to the axle). Also behind is a transmission 30 and a differential 52, wherein the differential 52 preferably is integrated into the oil circuit 31. A pulse inverter 38 is provided for each of the front and rear electric traction machines 2. A water circuit 35 is configured to control the temperature of the pulse inverter 38 and the first heat exchanger 12 and the second heat exchanger 34, wherein the heat from the water circuit 35 can be dissipated to the environment 37 via a third heat exchanger 39 (shown in this case comprising a fan). The guiding line is in this case indicated by solid line, and the return line respectively as a dotted line, so that the (third) circulation direction 36 of the water circuit 35 runs counterclockwise in the illustration. This is indicated likewise in the cooling system 1 on the electric traction machines 2 and in the oil circuit 31. For example, the cooling systems 1, the oil circuit 31, and the water circuit 35 are designed as shown (at least partially) in FIGS. 2 and 3, or FIG. 1. A processor 53 is in this case also indicated, by means of which the necessary control and/or regulation of the illustrated (and possibly further) components can be implemented. The processor 53 is, e.g., designed as a CPU, and/or is part of an onboard computer of the motor vehicle 3. In this case, provided purely optionally (e.g., in a carrier and/or rocker) is a volume compensation tank 49 that is, e.g., closed to the environment 39.

In an embodiment, the invention relates to a cooling system for an electric traction machine for a motor vehicle, said cooling system comprising at least the following components:

a circulation system;

a circulation pump for conveying a first cooling liquid;

a motor inlet connection for fluidically connecting the circulation system on the inlet side to a first winding head region of an electric traction machine intended to be temperature-controlled;

a motor outlet connection for fluidically connecting the circulation system on the outlet side to a second winding head region of an electric traction machine intended to be temperature-controlled; and a first heat exchanger for dissipating heat from and/or supplying heat to the first cooling liquid circulating in the circulation system, wherein the electrical traction machine comprises a plurality of cooling grooves arranged between the winding head regions for directing the cooling liquid. The cooling system is characterized in particular in that a second deaeration line is provided, by means of which, during normal orientation of the electrical traction machine, the respective highest locations of the winding head regions in the Earth's gravitational field are fluidically connected to one another.

Remaining gas entrainments in hydraulic undercuts of the electrical traction machine can be prevented using the cooling system disclosed here.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Cooling system
2 Traction machine
3 Motor vehicle
4 Circulation system
5 First cooling liquid
6 First circulation pump
7 AC housing
8 Motor inlet connection
9 Motor outlet connection
10 First winding head region 11 Second winding head region
12 First heat exchanger
13 Cooling groove
14 First main line
15 Second main line
16 First deaeration line
17 Second deaeration line
18 Bypass line
19 First bypass line connection
20 Second bypass line connection
21 Third bypass line connection
22 Earth's gravitational field
23 Highest location on the AC housing
24 Highest location on the first winding head region
25 Highest location on the second winding head region
26 Oil filter
27 Connecting line
28 Thermal management module
29 Powertrain
30 Transmission
31 Oil circuit
32 First circulation direction
33 Second circulation direction
34 Second heat exchanger
35 Water circuit
36 Third circulation direction
37 Third heat exchanger
38 Pulse inverter
39 Environment
40 Propulsion wheel
41 Chassis
42 Transport compartment
43 Transmission component
44 Oil sump
45 Coarse filter
46 Second circulation pump
47 Compensation tank
48 Gas
49 Volume compensation tank
50 Stator lamination package
51 Temperature sensor
52 Differential
53 Processor

The invention claimed is:

1. A cooling system for an electric traction machine for a motor vehicle, the cooling system comprising:

a circulation system for guiding a first cooling liquid that is circulating;

a first circulation pump for conveying the first cooling liquid in the circulation system;

a motor inlet connection for fluidically connecting the circulation system on an inlet side to a first winding head region of an electric traction machine intended to be temperature-controlled;

a motor outlet connection for fluidically connecting the circulation system on an outlet side to a second winding head region of the electric traction machine intended to be temperature-controlled; and a first heat exchanger for dissipating heat from and/or supplying heat to the first cooling liquid circulating in the circulation system, wherein the electric traction machine comprises a plurality of cooling grooves, which are arranged between the winding head regions and used to guide the first cooling liquid, and wherein a first deaeration line is provided, by which, given a predetermined orientation of the electric traction machine in the Earth's gravitational field, respective highest locations on the winding head regions are fluidically connected to each other.

2. The cooling system according to claim 1, wherein an AC housing is further provided for an AC power connection for the electric traction machine, wherein a temperature of the AC housing and/or an AC power connection in the AC housing can be controlled by the first cooling liquid, and wherein a second deaeration line is provided between the AC housing and one of the winding head regions.

3. The cooling system according to claim 2, wherein the second deaeration line is, given the predetermined orientation of the electric traction machine, indirectly or directly fluidically connected to at least one of the following highest locations in the Earth's gravitational field:

to the highest location on the AC housing;

to the highest location on the first winding head region; and to the highest location on the second winding head region.

4. The cooling system according to claim 2, wherein the AC housing is provided with at least one further connecting line to a motor input terminal and/or to the first winding head region, and wherein the at least one further connecting line is, given the predetermined orientation of the electric traction machine in the Earth's gravitational field, arranged below the second deaeration line.

5. A thermal management module for a powertrain of a motor vehicle, the module comprising:

for a transmission, an oil circuit with a second circulation direction and with a second heat exchanger;

for at least one vehicle component, a water circuit with a third circulation direction and with a third heat exchanger; and for an electric traction machine, the cooling system according to claim 1.

6. The thermal management module according to claim 5, wherein the water circuit is connected to the first heat exchanger of the cooling system for an electric traction machine for heat transfer.

7. The thermal management module according to claim 6, wherein the water circuit is additionally connected to the second heat exchanger of the oil circuit for heat transfer.

8. A powertrain for a motor vehicle, the powertrain comprising:

at least one electric traction machine for providing a torque;

at least one propulsion wheel for propelling the motor vehicle by a torque from the at least one electric traction machine;

at least one transmission for conducting a torque between the electric traction machine and at least one of the at least one propulsion wheels; and the cooling system according to claim 1 for at least one of the at least one electric traction machine, at least one of the at least one transmission, and at least one vehicle component for at least one of the at least one electric traction machine.

9. A motor vehicle, comprising:

a chassis with a transport compartment; and the powertrain according to claim 8 for propelling the motor vehicle.

10. The cooling system according to claim 2, wherein the second deaeration line is provided between the AC housing and the first of the winding head region.

11. The thermal management module according to claim 5, wherein a pulse inverter for the electric traction machine is arranged in the water circuit.

12. The thermal management module according to claim 6, wherein the water circuit is connected to the first heat exchanger as the only liquid-bonded heat transfer from the cooling system to the environment.

13. The thermal management module according to claim 6, wherein in the third circulation direction of the water circuit, a pulse inverter for an electric traction machine is arranged upstream of the first heat exchanger.

14. The thermal management module according to claim 7, wherein the water circuit is additionally connected to the second heat exchanger as the only liquid-bonded heat transfer from the cooling system to the environment.

15. The thermal management module according to claim 7, wherein in the third circulation direction of the water circuit, the first heat exchanger is arranged upstream of the second heat exchanger.

16. A powertrain for a motor vehicle, the powertrain comprising:

at least one electric traction machine for providing a torque;

at least one propulsion wheel for propelling the motor vehicle by a torque from the at least one electric traction machine;

at least one transmission for conducting a torque between the electric traction machine and at least one of the at least one propulsion wheel; and the thermal management module according to claim 5 for at least one of the at least one electric traction machine, at least one of the at least one transmission, and at least one vehicle component for at least one of the at least one electric traction machine.

17. The powertrain according to claim 16, wherein the at least one vehicle component is a pulse inverter.

18. The powertrain according to claim 8, wherein the at least one vehicle component is a pulse inverter.

* * * * *